United States Patent [19]

Dressler

[11] Patent Number: 4,796,163

[45] Date of Patent: Jan. 3, 1989

[54] MOTOR VEHICLE HEADLIGHT

[75] Inventor: Helmut Dressler, Leutenbach, Fed. Rep. of Germany

[73] Assignee: Robert Bosch GmbH, Stuttgart, Fed. Rep. of Germany

[21] Appl. No.: 938,052

[22] Filed: Nov. 17, 1986

[30] Foreign Application Priority Data

Nov. 30, 1985 [DE] Fed. Rep. of Germany ....... 3542457

[51] Int. Cl.[4] ............................................. B60Q 1/08

[52] U.S. Cl. ....................................... 362/61; 362/80; 362/294

[58] Field of Search ................... 362/61, 80, 294, 373, 362/96, 267

[56] References Cited

U.S. PATENT DOCUMENTS

| | | | |
|---|---|---|---|
| 4,569,007 | 2/1986 | Dick | 362/61 |
| 4,635,173 | 1/1987 | Dressler et al. | 362/373 |
| 4,636,921 | 1/1987 | Vollrath | 362/61 |

FOREIGN PATENT DOCUMENTS

| | | | |
|---|---|---|---|
| 2222449 | 11/1973 | Fed. Rep. of Germany | 362/80 |
| 2303473 | 8/1974 | Fed. Rep. of Germany | 362/80 |
| 3424205 | 11/1986 | Fed. Rep. of Germany | 362/373 |

*Primary Examiner*—Ira S. Lazarus
*Assistant Examiner*—D. M. Cox
*Attorney, Agent, or Firm*—Michael J. Striker

[57] ABSTRACT

A headlight for motor vehicles is provided with a unit for preventing fog formation on the internal walls of the headlight or its reflector. The unit can be interchangeable and includes an inlet valve for admitting air into the interior of the reflector when underpressure prevails in said interior and an overpressure-responsive outlet valve which permits air to flow out from said interior into the atmosphere when overpressure occurs in the interior of the reflector. The unit is filled with drying agent for adsorbing moisture from the passing air.

11 Claims, 1 Drawing Sheet

MOTOR VEHICLE HEADLIGHT

BACKGROUND OF THE INVENTION

The present invention relates to a headlight for a motor vehicle.

Headlights of the type under discussion include a frame and a reflector which form with a lens an interior space which is closed from the outer atmosphere.

One of conventional headlights of the foregoing type has been disclosed in DE-OS No. 31 47 013. In this conventional headlight, pressure compensation between the interior space of the reflector or headlight and the atmosphere is obtained by an inlet valve or an outlet valve. Hereby under normal operational conditions of the headlight fog formation on the walls of the interior of the headlight is substantially avoided and thus requirements to a proper function of the headlight would be fulfilled.

Such conventional headlights however, do not satisfy U.S. requirements to the headlights of this type because due to a quick cooling of the headlight dew drops are formed at the inner walls of the reflector and this dew occurs again shortly after the switching of the headlight on.

SUMMARY OF THE INVENTION

It is an object of the present invention to provide an improved motor vehicle headlight.

It is another object of the invention to avoid fog formation on the internal walls of the reflector of the headlight and to provide a headlight that would satisfy type tests e.g. DIN 54411 existing in the U.S.A.

These and other objects of invention are attained by a headlight for motor vehicles, comprising a frame, a reflector, an incandescent lamp, and a lens, wherein an interior space which is closed from the atmosphere is formed by the frame or reflector and the lens; an inlet valve through which air flows from the atmosphere into said interior space when underpressure is established in said interior space; at least one means which permits air to flow into the atmosphere from said interior space in response to overpressure established in said interior space; and drying means including a drying agent and arranged at said inlet valve, said drying agent absorbing moisture from the air flowing into said interior space.

In the headlight having a rectangular reclector which has a flat upper portion and a lower portion, said overpressure-responsive means may be an outlet valve, said inlet valve and said outlet valve being mounted at said lower portion. Thus warm air flowing from the interior space of the headlight into the atmosphere at least partially increases moisture content of the drying agent and regenerates the latter.

The reflector may have a housing portion having a frame and a bottom wall, said housing portion having an inlet opening in said bottom wall thereof, said housing portion being filled with said drying agent and being mounted to said lower portion of said reflector so that a movable closing element of said inlet valve closes said inlet opening upon application to said bottom wall; the headlight also may include an air-permeable film arranged between said drying agent and said inlet valve.

The headlight may further include a container filled with said drying agent and insertable into said housing portion, said container having a perforated wall and a film which closes an open side of said container.

The outlet valve may be integrated in said housing portion and form together with said inlet valve, said film and said drying agent a functional unit which has an outlet opening in said bottom wall, said outlet valve lying on an outer side of said bottom wall, said lower portion having a perforation; said unit further including a further air-permeable film positioned between said perforation and said drying agent.

The functional unit may be securable to an outer side of said lower portion of said reflector by a locking means. Thus this functional unit can be interchanged to provide interchangeability of the drying agent and the valves; such an interchange can be required at higher relative moisture content of the atmosphere in regard to permeation of plastic components.

The functional unit may be connected to said frame of the headlight and be hermetically connected to said interior space and to said reflector by means of a hose.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
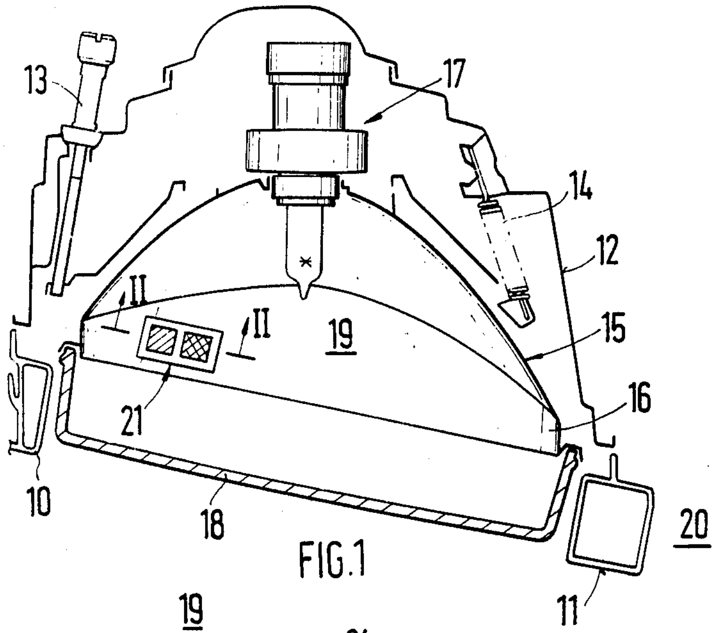
FIG. 1 is a schematic, partially sectional view of a rectangular headlight for a vehicle.

A so-called headlight unit includes a frame 12 secured to a vehicle body 10,11 and a rectangular reflector 15 adjustably mounted in the frame 12 by means of elements 13 and 14. Reflector 15 has a flat upper (lying above the plane of the drawing) and a lower portion 16, an incandescent lamp 17 inserted in the apex of the reflector and a lens 18 closing the light outlet opening; thereby an enclosed interior 19 is formed in respect to the outer atmosphere 20. A unit 21 fastened at the lower portion 16 of the reflector enables the inflow of air from the atmosphere 20 when underpressure occurs in the interior space 19 as opposed to the outflow of air when overpressure in that space takes place.

Figure 2:
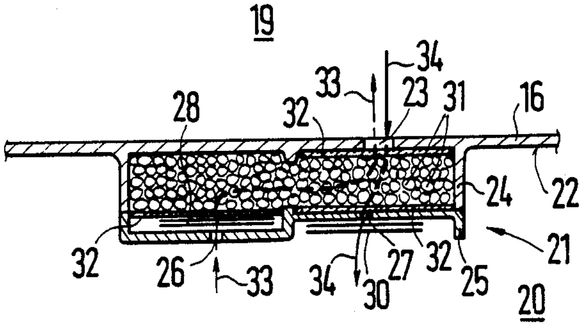
FIG. 2 is a sectional view taken along line II—II of FIG. 1 and showing a unit integrated in the reflector, according to the first embodiment of the invention.

The unit 21 shown in detail in FIG. 2 is mounted to an outer surface 22 of the lower portion 16 which has a perforation 23. The unit has a cup-shaped housing which is comprised of a frame 24 made of one piece with the lower portion 16 and a bottom wall 25 connected to frame 24. The bottom wall 25 has an inlet opening 26 which is closable from the inner wall of bottom wall 25 by an intake valve 28 and an outlet opening 27 which is closed by an outlet valve 30 at the outer side of the wall 25. The housing 24, 25 of unit 21 is filled with a drying agent 31. An air-permeable film 32 is provided between the drying agent 31 and the inlet valve 28; the same film also covers the perforation 23.

Alternatively, the frame and thus the whole unit can be secured to the outer surface of the lower portion 16 of the reflector by a locking means. Also the frame and the bottom wall can be made of one piece.

The unit 21 operates in the following fashion:

If underpressure is established in the interior 19 of the reflector 15 the inlet valve 28 responds to it and air flows into the interior 19 through opening 26 from the atmosphere 20 in the direction of arrow 33. The drying agent 31 absorbs moisture from the passing air. If air in the interior 19 is at overpressure the air will be discharged from this interior in the direction of arrow 34. At predetermined temperatures this passing air will remove moisture from the drying agent 31, which would cause a partial regeneration.

Figure 3:
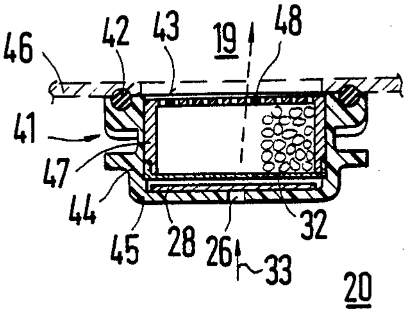
FIG. 3 is a sectional view similar to that of FIG. 2 but of the second embodiment of the invention.

In the second embodiment illustrated in FIG. 3 the unit of this invention is denoted by reference numeral 41. This unit includes a bottom wall 45 with an inlet opening 26 and a frame 44 which is secured to the outer surface of a lower portion 46 of the reflector (not shown) by means of a seal 42 and by a locking means provided in the region of a perforation 43. The inlet opening 26 is closable by the inlet valve 28 lying on the inner side of the bottom wall 45. A container 47 inserted in the housing 44, 45 of the unit 41 has a perforated bottom wall 48 filled with the drying agent 31 whereby an air permeable film 32 closes the opening of the container 47 and thus is arranged between the drying agent and the inlet valve 28.

If underpressure takes place in the interior space 19 air flows through opening 26 in the direction of arrow 33, open inlet valve 28, and moisture is adsorbed from the passing air by the drying agent 31. If overpressure prevails in the interior space 19 the internal air is discharged into atmosphere 20 via the outlet valve or other suitable arrangement.

It will be understood that each of the elements described above, or two or more together, may also find a useful application in other types of vehicle headlights differing from the types described above.

While the invention has been illustrated and described as embodied in a vehicle headlight, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A headlight for motor vehicles, comprising a frame, a reflector, an incandescent lamp, and a lens, wherein an interior space which is closed from the atmosphere is formed by the frame or the reflector and the lens; an moveable member inlet valve through which air flows from the atmosphere into said interior space when underpressure is established in said interior space; at least one means which permits air to flow into the atmosphere from said interior space in response to overpressure established in said interior space; and drying means including a drying agent and arranged between said moveable member inlet valve and said interior space, said drying agent absorbing moisture from the air flowing into said interior space, said reflector having a flat upper portion and a lower portion, said overpressure-responsive means being an outlet valve, said inlet valve and said moveable member outlet valve being mounted at said lower portion.

2. The headlight as defined in claim 1, wherein said reflector has a housing portion having a frame and a bottom wall, said housing portion having an inlet opening in said bottom wall thereof, said housing portion being filled with said drying agent and being mounted to said lower portion of said reflector so that a movable closing element of said moveable member inlet valve closes said inlet opening upon application to said bottom wall; and further including an air-permeable film arranged between said drying agent and said moveable member inlet valve.

3. The headlight as defined in claim 2, further including a container filled with said drying agent and insertable into said housing portion, said container having a perforated wall and a film which closes an open side of said container.

4. The headlight as defined in claim 2, wherein said moveable member outlet valve is integrated in said housing portion and forms together with said moveable member inlet valve, said film and said drying agent a functional unit which has an outlet opening in said bottom wall, said moveable member outlet valve lying on an outer side of said bottom wall, said lower portion having a perforation; said unit further including a further air-permeable film positioned between said perforation and said drying agent.

5. The headlight as defined in claim 4, wherein said functional unit is securable to an outer side of said lower portion of said reflector by a locking means.

6. The headlight as defined in claim 4, wherein said functional unit is connected to said frame of the headlight and is hermetically connected to said interior space.

7. A headlight for motor vehicles, comprising a frame, a reflector, an incandescent lamp, and a lens, wherein an interior space which is closed from the atmosphere is formed by the frame or the reflector and the lens; an inlet valve through which air flows from the atmosphere into said interior space when underpressure is established in said interior space; at least one means which permits air to flow into the atmosphere from said interior space in response to overpressure established in said interior space, said overpressure-responsive means being an outlet valve; drying means including a drying agent and arranged at said inlet valve, said drying agent absorbing moisture from the air flowing into said interior space, said reflector having a housing portion having a frame and a bottom wall, said housing portion having an inlet opening in said bottom wall thereof, said inlet valve being mounted at said reflector and having a movable closing element, said housing portion being filled with said drying agent and being mounted to said reflector so that the movable closing element of said inlet valve closes said inlet opening upon application to said bottom wall; and an air-permeable film arranged between said drying agent and said inlet valve.

8. The headlight as defined in claim 7, further including a container filled with said drying agent and insertable into said housing portion, said container having a perforated wall and a film which closes an open side of said container.

9. The headlight as defined in claim 7, wherein said outlet valve is integrated in said housing portion and forms together with said inlet valve, said film and said drying agent a functional unit which has an outlet opening in said bottom wall, said outlet valve lying on an outer side of said bottom wall, said reflector having a perforation; said unit further including a further air-permeable film positioned between said perforation and said drying agent.

10. The headlight as defined in claim 9, wherein said functional unit is securable to an outer side of said reflector by a locking means.

11. The headlight as defined in claim 9, wherein said functional unit is connected to said frame of the headlight and is hermetically connected to said interior space.

* * * * *